(12) United States Patent
Harrison et al.

(10) Patent No.: US 6,611,725 B1
(45) Date of Patent: Aug. 26, 2003

(54) COMPUTER DRAWING SYSTEM

(75) Inventors: Brian Harrison, Sun Prairie, WI (US); Robert P. Zuffante, Concord, MA (US); Zhonglin Han, Acton, MA (US); Boris Shoov, Cambridge (GB)

(73) Assignee: SolidWorks Corporation, Concord, MA (US)

( * ) Notice: Subject to any disclaimer, the term of this patent is extended or adjusted under 35 U.S.C. 154(b) by 277 days.

(21) Appl. No.: 09/668,852

(22) Filed: Sep. 25, 2000

Related U.S. Application Data

(60) Provisional application No. 60/180,076, filed on Feb. 3, 2000.

(51) Int. Cl.⁷ .............................................. G06F 19/00
(52) U.S. Cl. .......................... 700/98; 700/182; 345/420
(58) Field of Search .......................... 700/182, 98, 184, 700/178, 97; 345/420, 850

(56) References Cited

U.S. PATENT DOCUMENTS

| | | | |
|---|---|---|---|
| 5,006,991 A | * 4/1991 | Ohcoshi et al. | 700/178 |
| 5,615,321 A | 3/1997 | Corn | 395/133 |
| 5,619,630 A | * 4/1997 | Minami et al. | 345/619 |
| 5,815,154 A | 9/1998 | Hirschtick et al. | 345/356 |
| 5,821,941 A | 10/1998 | Millstein | 345/420 |
| 5,963,212 A | 10/1999 | Bakalash | 345/424 |
| 5,999,186 A | 12/1999 | Jackson | 345/420 |
| 6,219,055 B1 | * 4/2001 | Bhargava et al. | 345/850 |

OTHER PUBLICATIONS

Zuffante, Adding Engineering Features to a Hybrid Constructive Solid Geometry—Boundary Representation Solid Modeler: A Face Based Ancestry Approach.

* cited by examiner

*Primary Examiner*—Leo Picard
*Assistant Examiner*—Kidest Bahta
(74) *Attorney, Agent, or Firm*—James V. Mahon; Clifford Chance US LLP

(57) ABSTRACT

A method for processing a design model generated by a computer aided design system includes accessing model data that includes separately stored data documents detailing construction of the design model from a collection of components, processing the model data to generate image elements representing a projected view of the design model and to generate tag data associating each of the image elements with at least one of the of components and storing the first image elements and the first tag data in a drawing document. Supplementary data can be added to the drawing without the need for the external components to be available on disk or in memory. An updated drawing document can be generated following a change to one of the components. Generating an updated drawing document includes generating tag data that identifies matchings between the original and changed model components. Annotations and other supplementary data can be attached to image elements and stored in drawing documents. These annotations can be retained when the updated drawing document is produced. Methods of the invention can be implemented in software in a computer system.

33 Claims, 6 Drawing Sheets

COMPUTER DRAWING SYSTEM

CROSS-REFERENCE(S) TO RELATED APPLICATIONS

This application claims the benefit of the filing date of U.S. provisional application Ser. No. 60/180,076 entitled "Detachable Drawings" which was filed on Feb. 3, 2000.

BACKGROUND OF THE INVENTION

Computer-aided design (CAD) software allows a user to construct and manipulate design models representing complex three-dimensional (3D) objects. A number of different modeling techniques can be used to model a 3D object. These techniques include constructive solid geometry (CSG) modeling, boundary representation (BREP) modeling, and hybrid systems combining CSG and BREP modeling techniques. Other techniques are also known. CAD systems can combine basic modeling techniques with parametric modeling technologies that allow a model designer to define parameters interconnecting different components of a model. Parametric modeling can facilitate propagating changes among components.

A designer can model a 3D object from a collection of assemblies, subassemblies, and parts (collectively referred to as model "components"). Typically, a designer constructs these components (or obtains them from a library of pre-constructed components) and then brings the components together to form other components (i.e., assemblies) and, ultimately, to form the model. Each component may be stored as a separate computer document (i.e., a separate file in a local or distributed file system). Each component document can, in turn, reference other component documents. For example, in a model of a clock, the design of the different components of the clock (e.g., of the gears, the hands, and the housing) may be specified and stored in separate documents. The clock model, which is an assembly of these components, is formed using another data document that specifies relationships among these individual component documents (and possibly among other component documents). For example, a movement mechanism document can assemble the components of a clock movement mechanism by bringing together (using mating relationships) a collection of gear parts. The movement mechanism document (as well as, e.g., the design documents for the second and minute hands parts) may then be referenced by a clock assembly document. The clock assembly document may include mating relationships that interconnect the minute hand and second hand parts to the movement mechanism. In some cases, part and assembly documents can be referenced multiple times by other assembly documents. For example, the same gear design may be used four times in the clock's movement mechanism; this would result in the gear part document being referenced four times in the movement mechanism document.

After the 3D model has been designed, the CAD system can make two-dimensional drawings of the modeled object and of its components. Drawings are 2D projected views of the 3D model. Drawings may be created for a variety of purposes, such as to show a machine operator or a product assembler how to make a part and how to assemble parts into a final product. Each drawing may be stored as a separate drawing document on the CAD system. Drawing documents are self-contained insofar as the 2D projected view represented by the drawing document's data can be rendered (displayed) without having to access the various model documents used in the formation of the drawing document.

To create a drawing of an object, the CAD software constructs the model of the object from the various component documents referenced by the model's document. This construction process includes accessing data in all document files that are referenced (directly or indirectly) by the model document. For example, in the case of the clock model, the CAD software (i) accesses the clock model document; (ii) accesses documents for components referenced in the clock model document (i.e., the movement mechanism, minute hand, second hand, and clock housing documents); (iii) accesses documents for components referenced in the movement mechanism document; (iv) constructs the 3D model from each of the accessed documents, (iv) generate a 2D projected view from the 3D model; (v) stores the 2D projected view in a drawing document.

Processes for producing 2D projected views from 3D models are known. In fact, because a computer display screen is a 2D output device, a designer will typically interact with the 3D model using 2D projected views shown on a display screen. A 2D projected view can be stored in the drawing document using a vector graphic format. Vector graphics are used to represent an image as a collection of lines, splines, polygons, bounded regions, and other two-dimensional shapes. Example vector graphic formats include the scalable vector graphics (SVG) file format, the Adobe Illustrator (AI) file format, the Adobe Portable Document Format (PDF), and others.

SUMMARY OF THE INVENTION

In general, in one aspect, the invention features a computer-implemented method for processing a design model generated by a computer aided design system. The method includes accessing model data (which includes a collection of separately stored data documents that detail construction of the design model from a collection of components), processing the model data to generate image elements representing a projected view of the design model and to generate tag data associating each of the image elements with at least one of the model components, and storing the image elements and the tag data in a drawing document.

In general, in another aspect, the invention features a computer-implemented method for processing a drawing document generated by a computer aided design system. The drawing document includes image elements (e.g., vector drawing data) that can be rendered to display a 2D projected view of a 3D model and tag data associating each image element with components of the design model (with at least two of the components referenced by the tag data being specified in separately stored data documents). The method includes processing the drawing document to display the view of a design model on a computer display terminal, receiving a user input selecting one of the image elements, receiving supplementary data, and linking the supplementary data to one of the model components based on the tag data associating the selected image element with the first model component.

Implementations may include one or more of the following features. The model components may be interrelated by a hierarchical data structure in which the hierarchical relationships detail a construction of the modeled object. The hierarchical data structure may be a tree structure that includes parent-child relationships between the model components. Each of the model components may detail numerous structural features. For example, a model component may detail structural features such as the edges, vertices, and surfaces (as well as three dimensional interconnections between these structural features) for a modeled part or assembly. The tag data can associate each image element with a structural feature of a model component. The image elements can include vector image drawing data (e.g., lines, polygons, poly-lines, and filled regions) enable a two-dimensional rendering of a 3D model.

Each of the model's structural features (which includes each of the structural features from each of the model components) may be uniquely labeled by parametric data. The tag data may be derived from this parametric data (e.g., by copying the parametric data for use as the tag data, by creating pointers to the parametric data, by generating unique numeric references identifying the parametric data or indexing a table or database containing the parametric data, or by deriving URL or other file system paths that may incorporate all or parts of the parametric data to identifying a referenced structural feature).

In some implementations, supplementary data (e.g., an annotation) can be added to a drawing data file and associated with a particular structural feature of a model without requiring access to the model document or model component documents. Adding additional data to a drawing can include selecting one of the image data elements in the drawing, processing tag data to identify a structural feature associated with the first image data element (in some implementations, this processing may be accomplished by searching a table stored in the drawing document that matches image elements with parametric data), receiving the supplementary data, the supplementary data to the drawing data, and storing the supplemented drawing data. The supplemented drawing data may include the original (preannotated) drawing data, the supplementary data, and pointer data associating the supplementary data with components of the 3D design model (and/or with structural features of those components).

The supplementary data may be preserved when the drawing is updated (e.g., in response to changes in the underlying model or to a model component). This "preservation" of the data refers, generally, to an ability to preserve relationships between supplementary data and drawing document image elements when the drawing document is updated (e.g., in response to a change in the underlying 3D model data). Preservation of the supplementary data can include processing updated model data to generate new drawing, extracting supplementary data from an existing drawing, and transferring the extracted supplementary data to the new drawing document. The process of transferring the supplementary data uses the tag data associated with the image elements in the original drawing and the tag data associated with the image elements in the updated drawing to maintain matchings between the supplementary data and the proper image elements.

In some implementations, the supplementary data can be an annotation identifying a desired change in a model component. For example, a user may add an annotation (e.g., a size value) indicating that a particular component should be reduced in size. Implementations can process this annotations by "pushing" the size value data from drawing data file to the model component itself to alter the model data in accordance with the identified change.

Implementations may include one or more of the following advantages. A user can send a drawing file to another CAD user without sending associated model files (i.e., model component files), while still permitting the other CAD user to annotate and change the model file. Annotations to a drawing file can be automatically maintained and updated as underlying model data is changed. Annotations in a drawing document can be fully associative (i.e. the annotations remain attached to particular structural features of the model when the drawing document changes in response to model changes). Drawing documents can be opened, and annotations can be attached to structural features of a 3D model without requiring access to other model documents. Users can control when a drawing is updated to the model (i.e. the synchronization process of the drawing documents is responsive may be controlled by the user). In other implementations, the synchronization process may be automatic.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
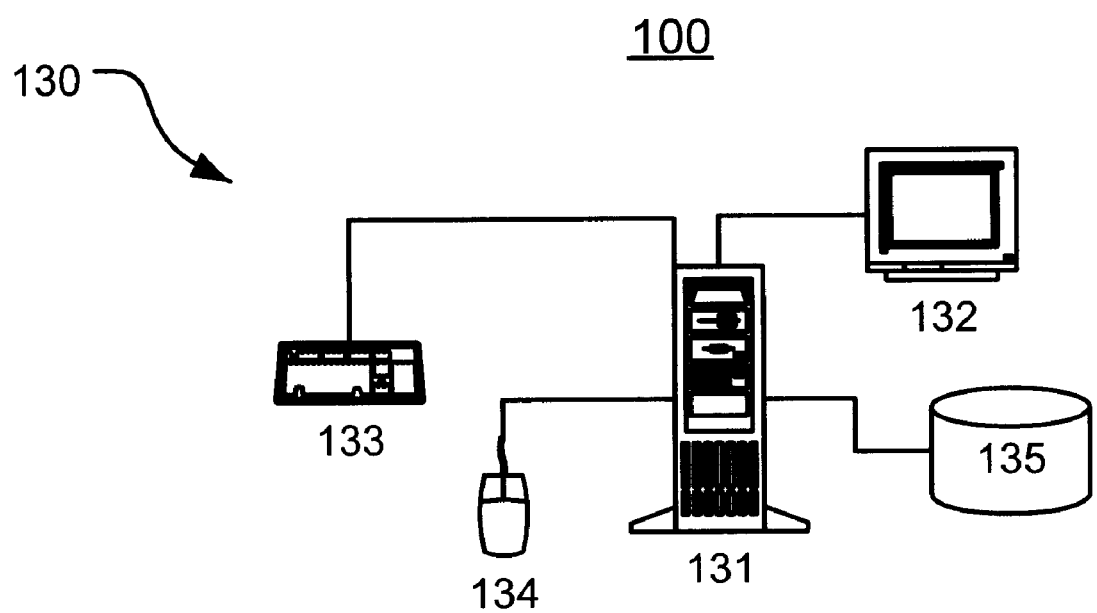
FIG. 1 is block diagram of a computer-based modeling system.

Two-dimensional (2D) drawing documents that are created from 3D models may be enhanced through the addition of annotations added by a user using a computer-based annotation tool. These annotations include, e.g., symbols indicating surface finishes and weld points, text notes, dimension measurements, and other types of supplementary data (i.e., data supplementing that found in the model and/or model component documents). Annotations may be attached to particular edges, vertices, faces, or other model elements visible in a drawing. In a conventional annotation system, annotations are added by selecting an arc, line, polygon, or other element of the 2-D drawing, and then attaching the annotation to the selected element. To enable this annotation, the annotation software (i) identifies the selected element of the 2-D drawing, and then (ii) analyzes the model to determine the part corresponding to the selected element. Determining the part corresponding to the selected feature may require that the annotation software access each document file that was referenced (directly or indirectly) while constructing the modeled object. For complex documents, opening each document file referenced while constructing the modeled object can require a significant amount of processing resources. Consequently, improved systems for annotating and otherwise manipulating 2-D drawings are desired.

Improved annotation, editing, addition of supplementary data, and other manipulations of 2-D drawings created by a CAD system can be accomplished using a drawing document format that includes image elements (e.g., vector drawing data) along with tag data that associates the image elements with the model components represented by the image elements. This association between tag data and image elements provides a linkage to components of a design model that are specified in other data documents (i.e., data files) and which are processed to generate the drawing document. Software tools can use the tag data in the drawing document to link supplementary data to model components without having to have actual access to the data documents in which the model components are specified. In addition, the drawing document can be updated in response to a change in the data in the model component documents, and the linkages between supplementary data and particular model components can be retained, using this tag data.

FIG. 1 shows a computerized modeling system 130 that includes a CPU 131, a CRT 132, a keyboard input device 133, a mouse input device 134, and a storage device 135. The CPU 131, CRT 132, keyboard 133, mouse 134, and storage device 135 can include commonly available computer hardware devices such as a Pentium-based computer. The mouse 134 has conventional left and right buttons that the user may press to issue a command to a computer-aided design (CAD) software program being executed by the CPU 131. Other appropriate computer hardware platforms are suitable as will become apparent from the discussion that follows. Typically, such computer hardware platforms include an operating system such as Microsoft Windows 2000™, UNIX™, LINUX™, or other operating system.

CAD software is stored on the storage device 135 and is loaded into and executed by the CPU 131. In various implementations, this software allows the user to create and modify a 3D model, to produce 2D drawings, and to implement other aspects of the invention described herein. The CPU 131 uses the CRT 132 to display projected views of the 3D model as described in more detail below. Projected views of the 3D model can also be stored in drawing documents and can be output to other devices (e.g., printers, plotters, and to manufacturing and machine control systems). A user actuates the keyboard 133 and the mouse 134 to enter and modify data for the 3D model. The CPU 131 accepts and processes input from the keyboard 133 and mouse 134. Using the CAD software, the CPU 131 processes the input along with the data associated with the 3D model and makes corresponding changes to the display on the CRT 132. Other input devices (e.g., voice dictation software and graphic tablets) as well as other output devices (e.g., a laser printer or plotter) can be added to the system 100.

Figure 2A:
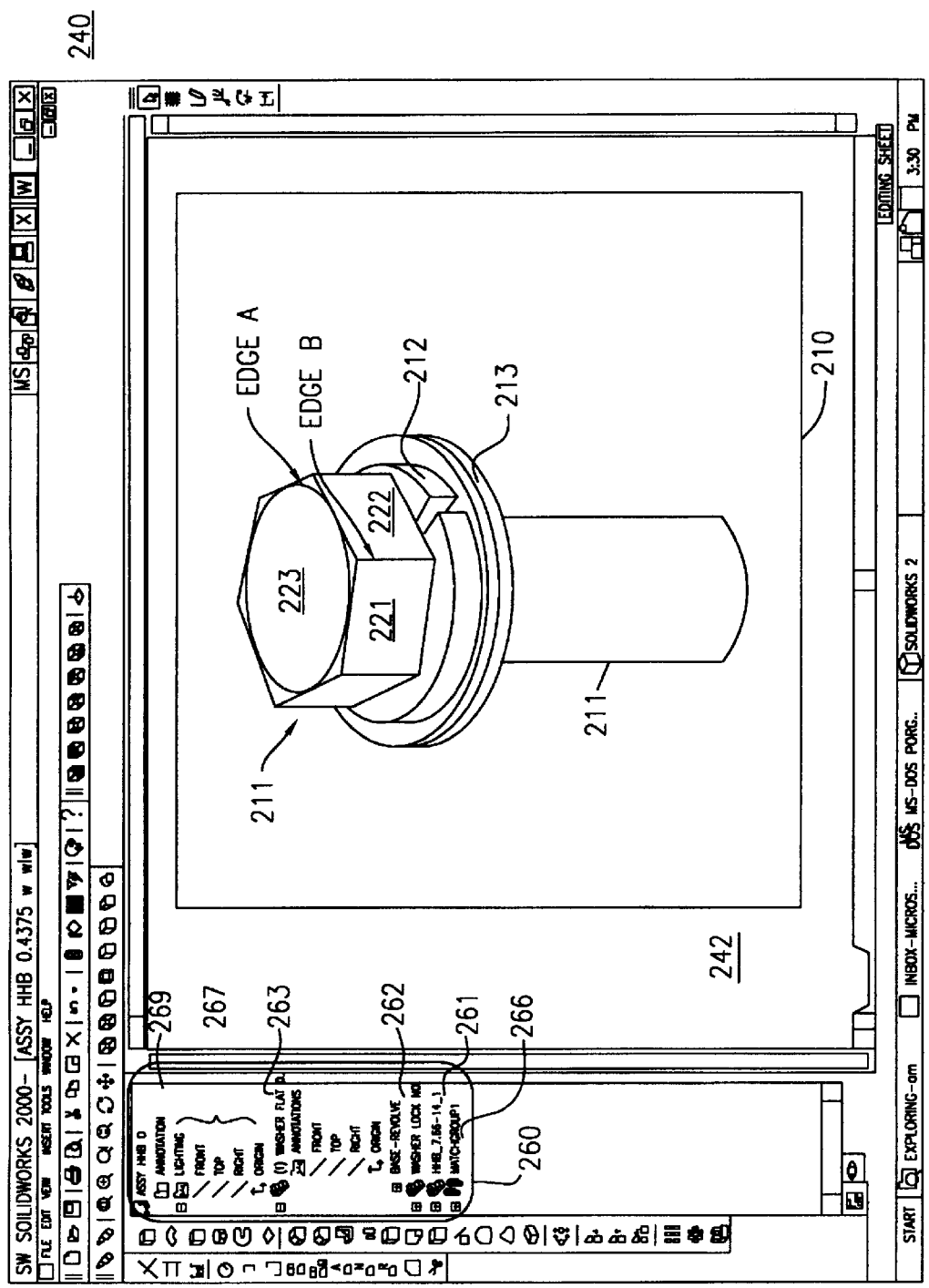
FIG. 2A is an illustration of a display during the model-design process.
Figure 2B:
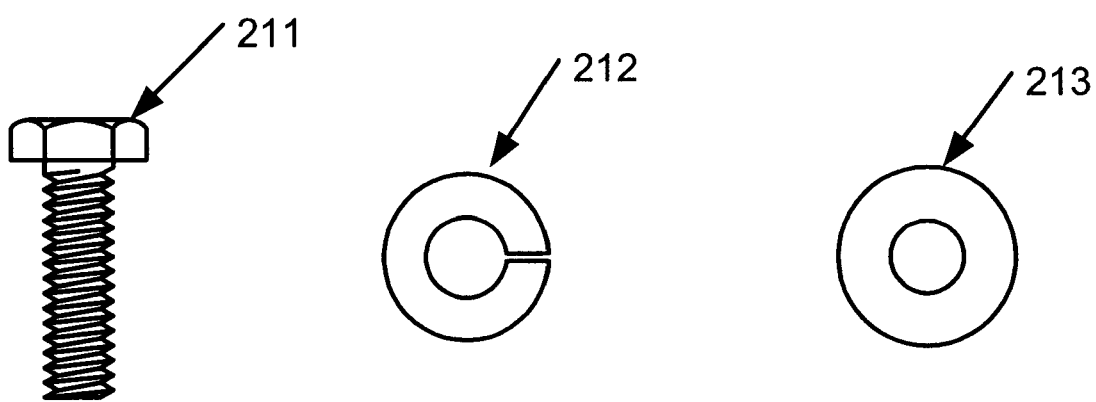
FIG. 2B is an illustration of views of the bolt, lock washer, and flat washer.

FIG. 2A shows an example of a CRT 132 display during the model-design process. The display 200 shows a graphical user interface (GUI) display window produced in a Microsoft Windows NT™-based implementation. The window 240 includes a modeling portion 242 that displays projected views 210 of a 3D model. The particular view shown in FIG. 2A is an isometric view of a 3D model that assembles together three parts: a bolt, a lock washer, and a flat washer to form a bolt assembly 210. The design tree 260 shows a hierarchy of different model components and modeling operations that are brought together in the modeling of the bolt assembly shown in window 242. In the design tree 260, the label 269 identifies the highest level of the design hierarchy for the bolt assembly 210. The design tree 260 also identifies a hierarchy of the other document files parts (and the associated components) referenced by the bolt assembly document 269. In particular, the tree indicates that the bolt assembly document 269 references three parts documents: a bolt document 261, a lock washer document 262, and a flat washer document 263. Additional views of the bolt 211, lock washer 212, and flat washer 213, as individually defined components in documents 261–263, are shown in FIG. 2B. In addition, the design tree 260 indicates that the document 269 includes mating relationships (labeled "MateGroup1") 266 that interconnect components of the modeled bolt assembly 210.

A designer creates the bolt assembly 210 by bringing together parts 211–213 using mating relationships 266 specified in the bolt assembly document 269. The CAD system 100 stores these mating relationships in the bolt assembly document along with references to the individual part documents 261–263 (and, in some cases, to other sub-assembly documents). In more complex models, a particular part or sub-assembly may be referenced multiple times. For example, bolt assembly document 269 may be referenced as a sub-assembly of a car door assembly document. The car door assembly document may reference the bolt assembly document multiple times (once for each bolt assembly used in the model of the car door). Each component and each structural feature (i.e., each edge, vertex, intersection of surfaces, intersection of components) in a model can be tagged with parametric data that uniquely identifies the component and/or structural feature. For example, within the document file 261, the surface 221 of the bolt may be labeled with the parametric identifier "AAA.221", and surface 222 may be labeled with the parametric identifier "AAA.222". Additional parametric data may be added within a referencing document or if multiple instances of a component are referenced. For example, within the document 269, the surface 221 and 222 may be labeled as "BBB.AAA.221" and "BBB.AAA.222". That is, the additional parametric data "BBB" is added in document 269 to identify the referencing document. Similarly, if multiple instances of a component are referenced, additional data (e.g., sequential numbers "1", "2", "3") can be added to track the instance. Thus, in a second instance referenced from document 269, the surface 221 may be identified as "BBB.2.AAA.222". This is just one way of parametrically labeling the structural features of components. Other labeling schemes that allow structural features to be identified and distinguished can be used. In some cases, a structural feature (e.g., an intersection) may have a parametric identifier that is a combination of other identified surfaces. Thus, in a drawing document, each line, arc, polygon, rectangle, circle, ellipse, line, polyline, polygon, boundary, or other image data element in the drawing file may be tagged with parametric data identifying a corresponding edge, vertex, face, or surface of a model component.

The hierarchical structure of assemblies, sub-assemblies, parts, and their mating relationships, controls the rendering of a modeled object by the CAD software and the creation of drawing (i.e., 2D projections of the modeled object). To create a drawing of an object, the CAD software accesses the data in each of component document that is referenced (directly or indirectly) in another document. For example, in the case of the bolt assembly 210, the CAD software accesses a document for the assembly 210 as well as the bolt part document, a lock washer document, and a flat washer document (a total of four documents). The CAD software then constructs a 3D model of the assembly 210 using data obtained from the four documents. The CAD software can then render a projected view of the modeled object by determining a collection of arcs, polygons, rectangles, circles, ellipses, lines, polylines, polygons, bounded regions, and other image elements. The image elements forming the projected view can be stored in a stand-alone 2D drawing document. By stand-alone, what is meant is that access to the 3D model document files is not needed for the display of the 2D drawing.

Each vector image element in the 2D drawing document is derived from a component of the 3D model. For example, during rendering of the 3D model 210, a vector image element (i.e., the vertical line labeled "Edge B") is generated to represent an intersection between surfaces 221 and 222 of the hexagonal bolt head. As a model is rendered to produce a drawing document, each vector image element can be tagged with the parametric data that identifies the model component that the image element represents. For example, the line representing edge B may be tagged with the parametric data "AAA.221:AAA.222" to indicate that the image element represents an edge between surfaces 221 and 222. Thus, the system 100 can generate a 2D drawing document in which each image element is tagged with parametric data identifying the 3D model component(s) represented (in whole or in part) by the tagged image element.

The drawing document stores image elements and tags such that the structural features of the particular model component(s) represented by an image element can be determined. The way in which the 2D vector image element is tagged with the parametric data will depend on the particular image element format. In an implementation using the Scaleable Vector Graphic (SVG) vector image format, the parametric data may be associated with an image data element using the SVG 'a' element to insert parametric data in the form of a hyperlink. Alternatively, SVG foreign namespace and/or private data can be used to associate the parametric data with an image data element. Other implementations can embed the parametric data in the form of comments, pointers, or other data type. In some cases, each element may have a simple identifier referencing a table in which the parametric data (as well as supplementary data, discussed below) can be stored. Still other formats can be used.

After the drawing document has been generated, supplementary data may be added to the drawing document by the user. Annotations are an example of supplementary data that can be added to the 2D drawing file. Annotations can include text-based notes, graphical symbols, dimensions, and other types of data.

To add supplementary data to the drawing document, the drawing document is rendered on a computer display terminal and the user selects an image element displayed on the terminal. The image element can be selected, e.g., using a pointer displayed on the terminal and manipulated by a mouse input device. The ability to select image elements displayed on a terminal is known in the art and is used, for example, in conventional vector image drawing software. After selecting an image element, the user may then activate a procedure allowing supplementary data to be input. Different procedures for adding data can be selected using menu or icon selection or by keyboard input. For example, by selecting appropriate menu items, the user may indicate that a text annotation, a dimension symbol, a welding symbol, or other supplementary data is to be added. In some cases (e.g., when the supplementary data is text), a dialog box may be displayed allowing the user to input the supplementary data.

Figure 3:
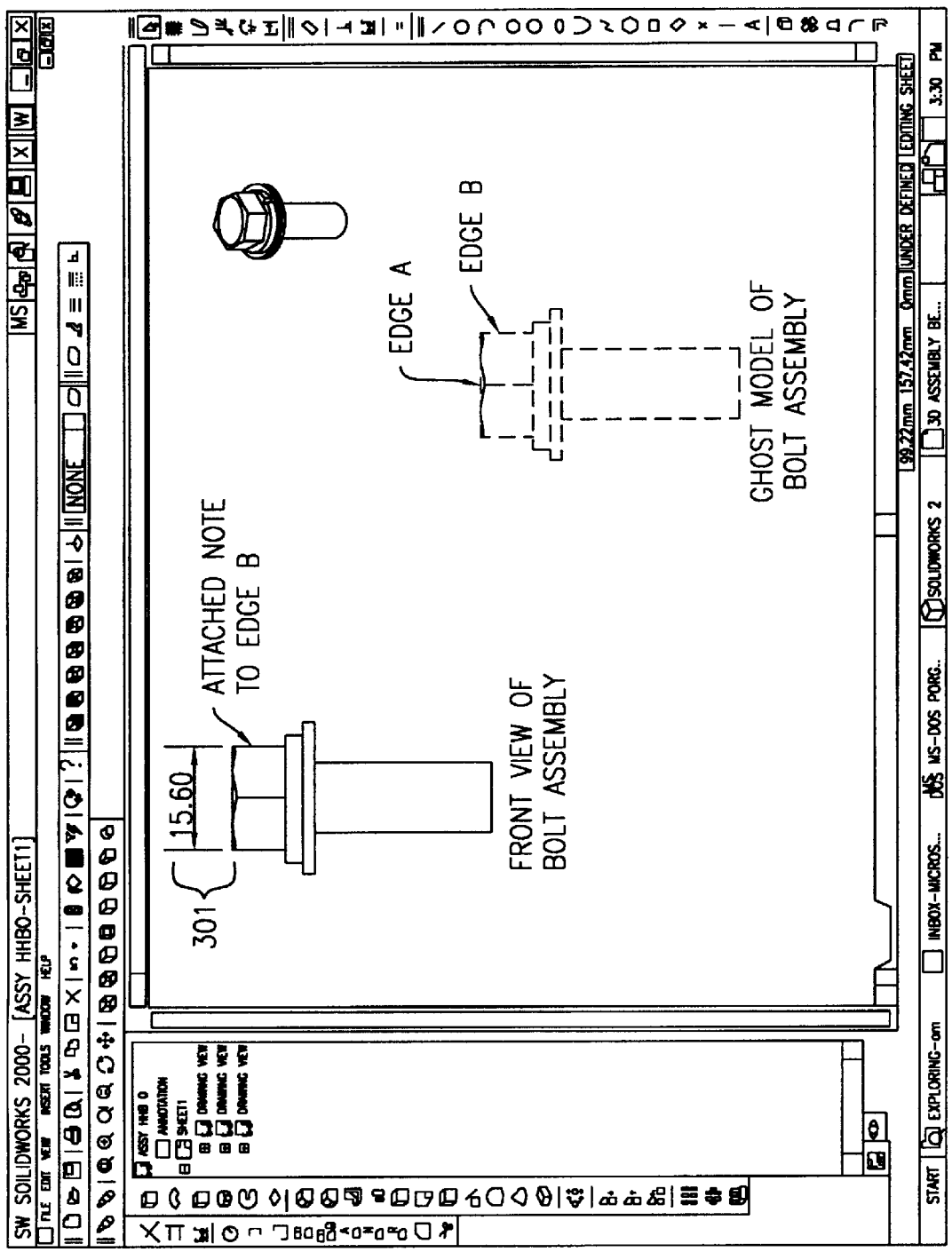
FIG. 3 is an illustration of a dimension.

Parametric data associated with the selected image element(s) can be used to link the supplementary data with the structural features (i.e., components, component intersections, assemblies of components, and/or particular sub-features of components or component assemblies) of the design model represented by the image element. For example, a text-based note can be linked to the vertical line image element representing "Edge B" of FIG. 2A such that the note is displayed at a particular location relative to the image element. Referring to FIG. 3, as another example, a dimension symbol 301 can be added to a 2D document to indicate the diameter of the top surface 223 of the bolt. In some implementations, a measurement ("15.60") displayed as part of the dimension symbol 301 is automatically determined based on data (e.g., a drawing scale or measurements pre-computed in forming the drawing document) that is stored in the drawing document. Supplementary data may then be stored in the drawing file. This linking of supplementary data to the model components is based on the tag data in the drawing document and does not require access to the model component documents.

Figure 4:
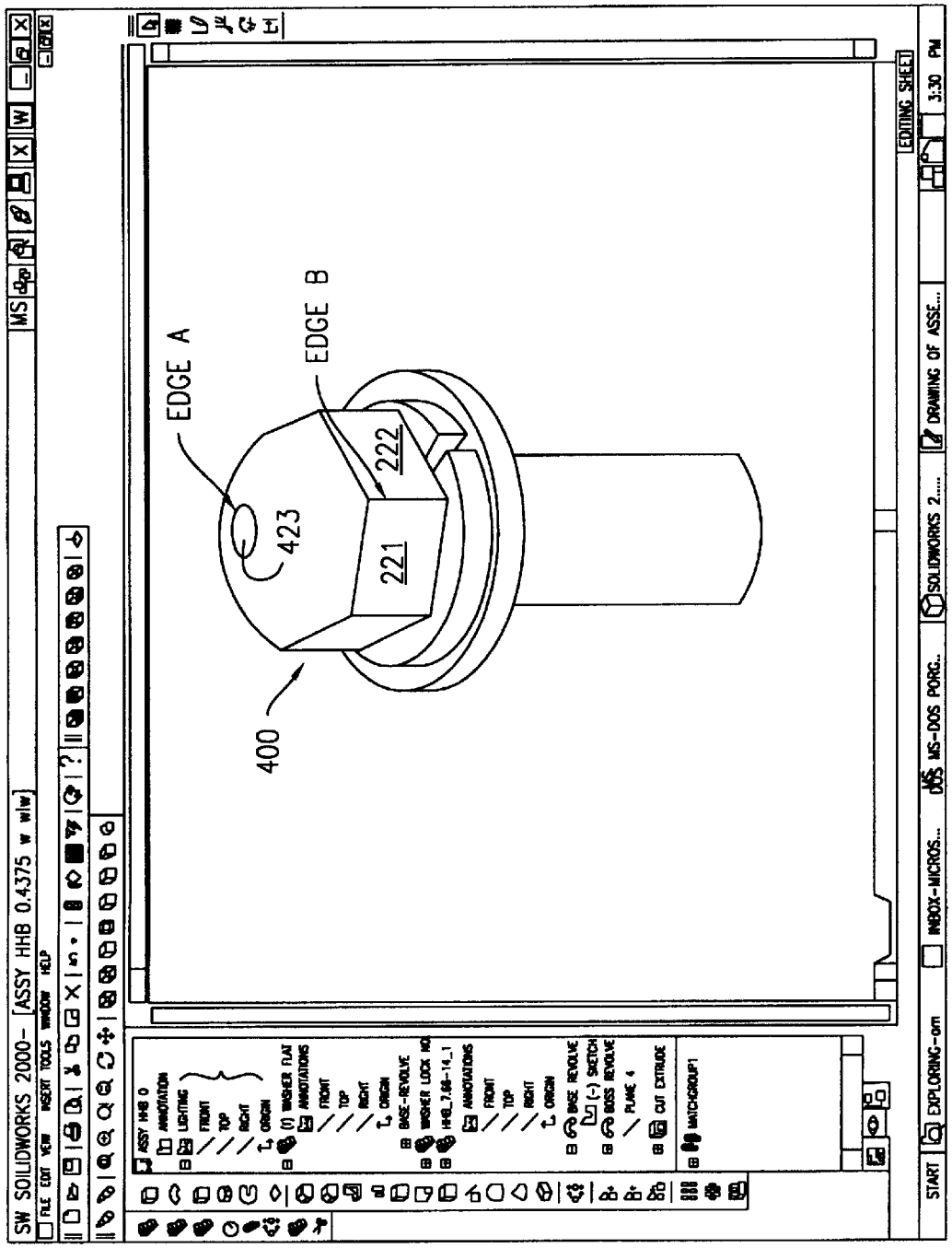
FIG. 4 is an illustration of the effect of reducing the diameter of the top surface.
Figure 5:
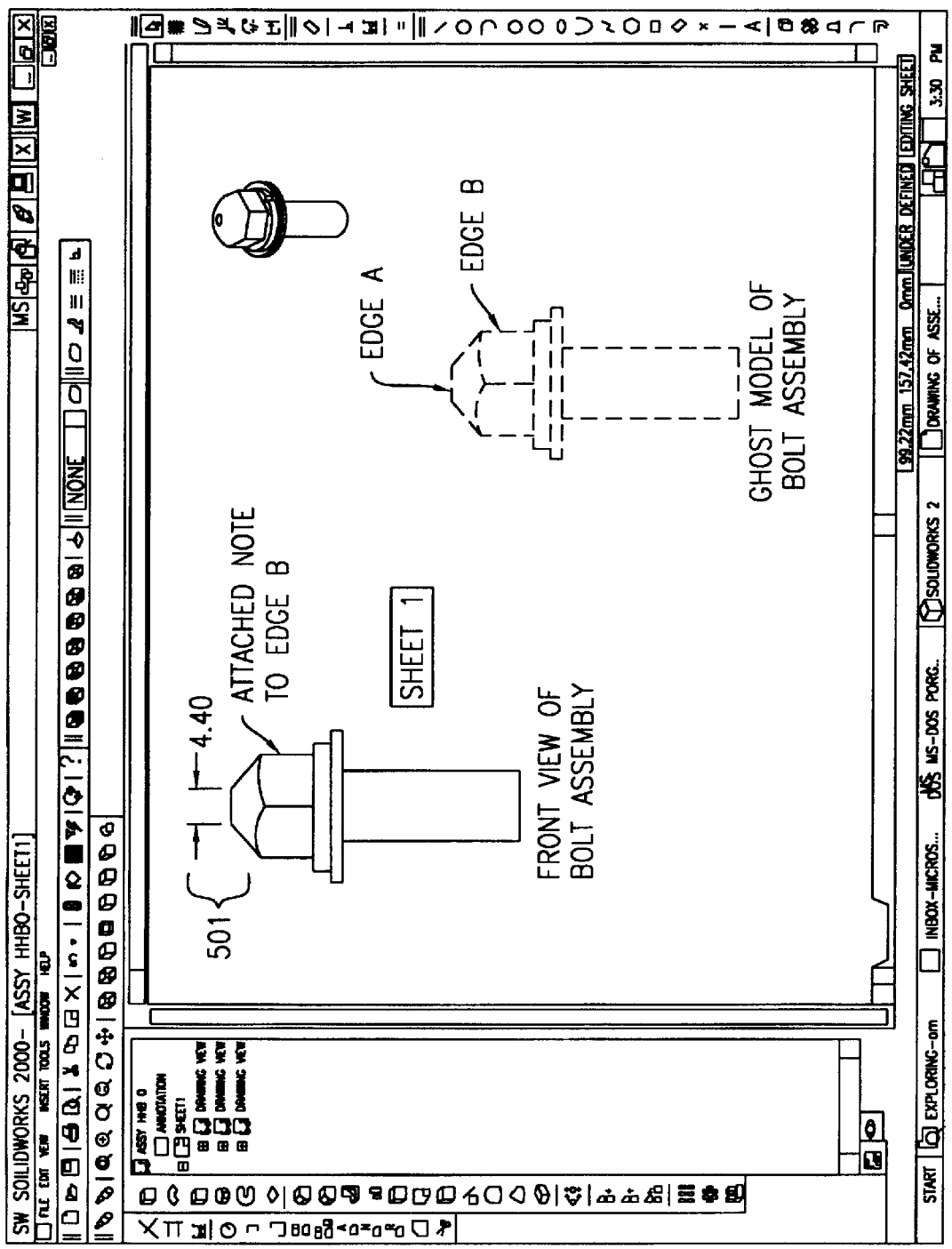
FIG. 5 is an illustration of annotation automatically updated with the new dimension value.

Using tag data to create linkages between the supplementary data and the 3D model components helps to maintain associations between the supplementary data and the 3D model components when components of the model are changed. For example, if the diameter of the top surface 223 of the bolt is reduced (i.e., by changing it in the document file 261), a new drawing 400 (FIG. 4) that shows the effect of reducing the diameter of top surface 223 can be produced. When the new drawing 400 is produced, the supplementary data (e.g., annotation 301) can be automatically transferred to the new drawing and correctly linked to the revised surface 423. In the example discussed above, the diameter annotation 301 can be automatically transferred to retain the dimension annotation as annotation 501 (FIG. 5). Note that, as shown in FIG. 5, the annotation 501 may be automatically updated with the new dimension value ("4.40").

The automatic transfer of supplementary data is guided by the parametric data included in a drawing document when the drawing document is produced from a 3D model. To transfer the supplementary data, the system 100 looks for matches between parametric data in the original document and in the updated drawing documents to control the linking of supplementary data in the updated drawing document. For example, assume that the supplementary data "DATA-VALUE1" is stored in an original drawing document and is associated with an image element that is linked to a model component by the parametric tag "AAA123." When an updated drawing document is produced, the system 100 extracts the data value "DATAVALUE1" from the original drawing document and searches the updated drawing document for an image element bearing the parametric tag "AAA123". If such an image element is found, the supplementary data "DATAVALUE1" is transferred to the updated drawing document and is associated with the found image element (and thus linked to the appropriate model component).

The process of "transferring" supplementary data from an original to an updated drawing document may, in some implementations, be performed by updating data within the original drawing document to, in effect, create the updated drawing document. That is, to produce the "updated" drawing document, the system 100 may update the image elements in the original drawing document to produce the updated drawing document. In such implementations, the "transfer" of supplementary data from the original to the updated drawing document does not require an actual movement of the supplementary data between different drawing documents but rather is a logical transfer.

In some cases, such as when components in a design model are added or deleted, the system may not be able to locate an image element in the updated drawing document that is tagged with the same tag data as the supplementary data to be transferred from the original drawing document. In such cases, the user may be prompted to re-link the supplementary data or to have it discarded.

A rebuild function can notify the user that a drawing and an associated design model are not synchronized. An update function can automatically update dimensions and annotation, including insertion of balloons and pending changes and bi-directional associative dimensions and annotations.

In some cases, supplementary data may also be transferred among multiple different views of the same design model. For example, if a user has linked an annotation 301 to the top surface 223 of the bolt (as shown in the front view of FIG. 3), the system 100 may include that annotation in an additional view of the model (e.g., in a top view).

In some implementations, the system 100 can render a view (a "ghost view") that includes, for example, visible features rendered using solid lines and hidden features represented using dotted lines. A user may be able to use this "ghost view" to link the supplementary data to hidden features. This supplementary data may then be automatically transferred to other drawings where the corresponding features are visible.

Since annotations are parametrically associated with structural features, "loss" of the annotations can be prevented even where there may be significant alterations in the placement of structural features. During geometric change, topology based features would remain attached to an entity whenever the entity is affected by a change. If an edge (i.e., a structural feature) of a model component becomes shorter or changes location and orientation, the annotation can remain correctly attached. Correspondingly, if a drawing is rendered from a different perspective, annotations may remain attached to the correct structural feature even though the drawing may be rendered from a different perspective.

As used herein the term "document" refers to computer-generated data stored on a data storage media. The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A computer-implemented method for processing a design model generated by a computer aided design system, the method comprising:

accessing model data comprising a plurality of separately stored data documents detailing construction of the design model from a plurality of components;

processing the model data to generate a first plurality of image elements representing a first projected view of the design model and to generate first tag data associating at least one of the first image elements with at least one of the plurality of components; and storing the first image elements and the first tag data in a first drawing document.

2. The method of claim 1 wherein each component is a component selected from the group consisting of a part, an assembly, and a subassembly.

3. The method of claim 1 wherein each of the data documents details a construction of at least one of the components of the design model.

4. The method of claim 3 wherein the model data details construction of the design model based on a hierarchical relationship among different ones of the components.

5. The method of claim 3 wherein:

the model data further comprises parametric data identifying structural features of the design model that are associated with ones of the components; and the first image elements detail graphical rendering of structural features of the design model in the first projected view.

6. The method of claim 5 wherein the design model comprises a three-dimensional model, the model data details a three-dimensional construction of the design model, and the first image elements detail a two-dimensional representation of the design model.

7. The method of claim 5 wherein the structural features comprises structural features selected from the group consisting of edges, vertices, surfaces, intersections of surfaces, and intersections of components.

8. The method of claim 1 further comprising:

processing the model data to generate a second plurality of image elements representing a second projected view of the design model that is different from the first projected view and to generate second tag data associating each of the second image elements with at least one of the components; and storing the second plurality of image elements and the second tag data in a drawing document.

9. A computer-implemented method for processing a drawing document generated by a computer aided design system, the method comprising:

processing a drawing document to display a view of a design model on a computer display terminal, the drawing document comprising:

a plurality of image elements that can be rendered to display the view, and tag data associating each image element with at least one of a plurality of components of the design model, at least two of the components being specified in separately stored data documents;

receiving a user input selecting one of the image elements;

receiving supplementary data; and linking the supplementary data to a first model component based on the tag data associating the selected image element with the first model component.

10. The method of claim 9 wherein:

the selected image element represents an intersection between a surface of the first model component and a surface of a second model component;

the tag data associating the selected image element with the first model component further associates the selected image element with the second model component; and linking the supplementary data to the first model component further comprises linking the supplementary data to the second model component.

11. The method of claim 10 wherein:

the first model component is specified in a first data document;

the second model component is specified in a second data document;

the intersection between the first and second model components is specified in a third data document;

the first, second, and third data documents are stored separately from each other; and the tag data associating the selected image element with the first model component and with the second model component comprises an identifier of the surface of the first model component and an identifier of the surface of the second model component.

12. The method of claim 11 wherein the supplementary data comprises an annotation comprising a measurement of the intersection.

13. The method of claim 9 wherein the supplementary data comprises a text annotation and linking the supplementary data comprises configuring a position of display of the text annotation relative to the first image element.

14. The method of claim 9 further comprising:

storing an updated drawing document comprising the plurality of image elements, the tag data, the supplementary data, and data identifying the linking of the supplementary data to the first model component.

15. The method of claim 9 further comprising:

changing a dimension of the first model component to produce an updated model component;

generating an updated drawing document comprising an updated plurality of image elements and tag data associating each of the updated plurality of image elements with at least one of the updated plurality of components;

wherein:

the updated plurality of components comprises the updated model component, the updated plurality of image elements comprises a first updated image element associated with the updated model component, the tag data associating the first image element with the first model component and the tag data associating the first updated image element with the updated model component identifies a matching between the first image element and the first updated image element.

16. The method of claim 15 wherein the tag data associating the first image element with the first model component and the tag data associating the first updated image element with the updated model component is substantially identical.

17. The method of claim 15 wherein the identified matching between the first image element and the first updated image element identifies a structural correlation between the first model component and the updated model component.

18. A computer program apparatus comprising a media storing instructions to configure a computer to process a design model generated by a computer aided design system, the instructions to process the design model comprising instructions to:

access model data comprising a plurality of separately stored data documents detailing construction of the design model from a plurality of components;

process the model data to generate a first plurality of image elements representing a first projected view of the design model and to generate first tag data associating each of the first image elements with at least one of the plurality of components; and store the first image elements and the first tag data in a first drawing document.

19. The method of claim 18 wherein:

the model data details construction of the design model based on a hierarchical relationship among different ones of the components; and each of the data documents details a construction of at least one of the components of the design model.

20. The method of claim 19 wherein:

the model data further comprises parametric data identifying structural features of the design model that are associated with ones of the components; and the first image elements detail graphical rendering of structural features of the design model in the first projected view.

21. A computer program apparatus comprising a media storing instructions to configure a computer to process a drawing document generated by a computer aided design system, the instructions to process the drawing document comprising instructions to:

process the drawing document to display a view of a design model on a computer display terminal, the drawing document comprising:

a plurality of image elements that can be rendered to display the view, and tag data associating each image element with at least one of a plurality of components of the design model, at least two of the components being specified in separately stored data documents;

receive a user input selecting one of the image elements;

receive supplementary data; and link the supplementary data to a first model component based on the tag data associating the selected image element with the first model component.

22. The apparatus of claim 21 further wherein:

the instructions to link the supplementary data to the first model component further comprises instructions to link the supplementary data to a second model component when tag data associated with a selected image element associates the selected image element with both the first and the second model components.

23. The apparatus of claim 22 wherein:

the tag data associating the selected image element with the first model component and with the second model component comprises an identifier of the surface of the first model component and an identifier of the surface of the second model component.

24. The apparatus of claim 21 further comprising instructions to:

store an updated drawing document comprising the plurality of image elements, the tag data, the supplementary data, and data identifying the linking of the supplementary data to the first model component.

25. The apparatus of claim 21 further comprising instructions to:

change a dimension of the first model component to produce an updated model component;

generate an updated drawing document comprising an updated plurality of image elements and tag data associating each of the updated plurality of image elements with at least one of the updated plurality of components;

wherein:
the updated plurality of components comprises the updated model component,
the updated plurality of image elements comprises a first updated image element associated with the updated model component,
the tag data associating the first image element with the first model component and the tag data associating the first updated image element with the updated model component identifies a matching between the first image element and the first updated image element.

26. A computer aided design system comprising:

a processor operatively coupled to a data storage system, the data storage system comprising a design model stored as a plurality of separately stored data documents; and a data storage memory operatively coupled to the processor and comprising instructions to configure the processor to:

process the design model by accessing the plurality of separately stored data documents and generating a first plurality of image elements representing a first projected view of the design model and by generating first tag data associating each of the first image elements with at least one of the plurality of components stored in the data storage system; and store the first image elements and the first tag data in a first drawing document.

27. The system of claim 26 wherein:

the model data details construction of the design model based on a hierarchical relationship among different ones of the components; and each of the data documents details a construction of at least one of the components of the design model.

28. The method of claim 27 wherein:

the model data further comprises parametric data identifying structural features of the design model that are associated with ones of the components; and the first image elements detail graphical rendering of structural features of the design model in the first projected view.

29. A computer aided design system comprising:

a processor operatively coupled to a data storage system, the data storage system comprising a stored drawing document, the drawing document comprising a plurality of image elements that can be rendered to display a view of a design model and tag data associating each image element with at least one of a plurality of components of the design model, at least two of the components being specified in different data documents; and a data storage memory operatively coupled to the processor and comprising instructions to configure the processor to:

process the drawing document to display a view of the design model on a computer display terminal;
receive a user input selecting one of the image elements;
receive supplementary data; and
link the supplementary data to a first model component based on tag data associating the selected image element with the first model component.

30. The apparatus of claim 29 wherein:

the instructions to link the supplementary data to the first model component further comprises instructions to link the supplementary data to a second model component when tag data associated with a selected image element associates the selected image element with both the first and the second model components.

31. The apparatus of claim 30 wherein:

the tag data associating the selected image element with the first model component and with the second model component comprises an identifier of the surface of the first model component and an identifier of the surface of the second model component.

32. The apparatus of claim 29 further comprising instructions to:

store an updated drawing document comprising the plurality of image elements, the tag data, the supplementary data, and data identifying the linking of the supplementary data to the first model component.

33. The apparatus of claim 29 further comprising instructions to:

change a dimension of the first model component to produce an updated model component;

generate an updated drawing document comprising an updated plurality of image elements and tag data associating each of the updated plurality of image elements with at least one of the updated plurality of components;

wherein:
the updated plurality of components comprises the updated model component,
the updated plurality of image elements comprises a first updated image element associated with the updated model component,
the tag data associating the first image element with the first model component and the tag data associating the first updated image element with the updated model component identifies a matching between the first image element and the first updated image element.

* * * * *